Dec. 28, 1954   N. B. MICKELSON   2,698,395
ELECTROMAGNETIC DEVICE
Filed Oct. 10, 1952

INVENTOR.
NILS B. MICKELSON
BY
Erwin B. Steinberg
agent

United States Patent Office 2,698,395
Patented Dec. 28, 1954

2,698,395
ELECTROMAGNETIC DEVICE

Nils B. Mickelson, Stamford, Conn., assignor to The Reflectone Corporation, a corporation of Connecticut Application October 10, 1952, Serial No. 314,024

4 Claims. (Cl. 310—149)

The present invention relates to electro-magnetic devices and has particular reference to the construction of a rotating electro-magnetic device for obtaining the sine and cosine function of a direct current voltage.

In the art of computing devices, particularly analog computers, it is frequently required that a direct voltage be resolved into two components one of which represents the product of the direct current voltage applied and the sine of a desired angle and the other represents the product of direct current voltage applied and the cosine of that angle. Several devices exist which permit such a result to be obtained notably potentiometers which are constructed in such a special manner as to give an output voltage which represents the input voltage times the sine or cosine of the angular displacement of a movable element of the potentiometer. Devices of this type have several shortcomings. The output voltage increases and decreases in step by step fashion as a sliding contact advances over loops of the stationary winding. The impedance is high and varies with the angle of rotational adjustment.

One of the principal objects of this invention is to provide an improved device for generating two voltages representing the sine and cosine functions of a direct current voltage.

Another object of the invention is to provide a sine and cosine function device which has no limit as to angular range.

Another object of the invention is the provision of a sine and cosine function device with comparatively low impedance and stepless output voltage adjustment.

A still further object of the invention is the provision of a sine-cosine function device with high resolution capabilities.

A further object of this invention is to provide a device for generating two voltages representing the sine and cosine functions of an output voltage in which the amplitude of the output voltage may be adjusted within wide limits.

Another important feature of this invention is the provision of a resolving device which is relatively simple and economical in construction, durable and which will not readily deteriorate or get out of order.

The invention concerns an electro-magnetic device for generating two voltages representing the sine and cosine functions of an output voltage and comprises a stator having a plurality of transverse slots with field windings disposed in said slots. A rotor rotatably disposed within said stator is constructed with an armature winding and a commutator. A plurality of brushes contact the commutator at mutually normal axes. The field windings on being energized with direct current are adapted to establish a magnetic flux pattern for generating voltages apparent on said brushes when motion is imparted to said rotor whereby said voltages are proportional to the sine and cosine respectively of the angular disposition of the brushes with respect to the magnetic flux pattern.

For a better understanding of the present invention together with other and further objects thereof reference is made to the following descriptions taken in connection with the accompanying drawings in which.

Figure 1:
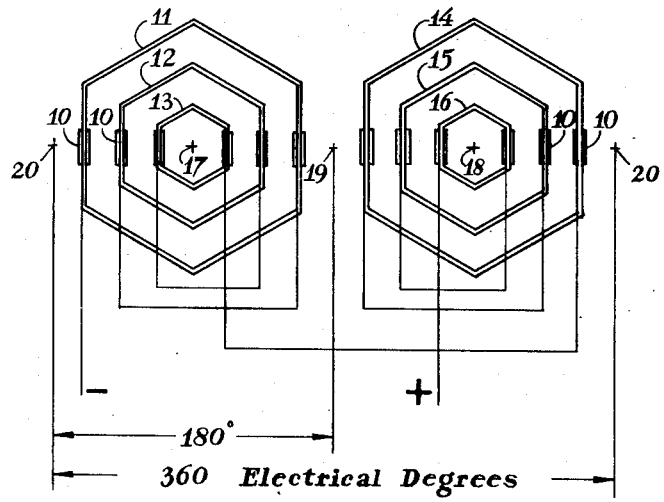
Figure 1 is a more or less diagrammatic view of the field windings of the stator.
Figure 2:
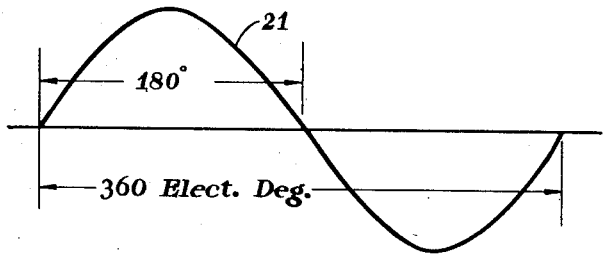
Figure 2 is a typical magnetic flux pattern produced by the field windings.

Referring to Figure 1, numeral 10, indicates transverse slots in the stator of a typical generator when shown in an exploded plan view. A certain number of field coils 11, 12, 13 and 14, 15 and 16 respectively are disposed in the slots of the stator and arranged in such a manner as to produce a maximum flux near the common center of the respective coils indicated by numerals 17 and 18 and a diminishing magnetic flux toward the outside of the coils with zero flux indicated by numerals 19 and 20 respectively. Furthermore, coils 11, 12 and 13 are connected in series and produce a flux in opposite direction with respect to the series connected coils 14, 15 and 16. The result of such a coil arrangement, as is well known, is a substantially sinusoidal flux pattern as depicted in Figure 2 by curve 21. There are various methods to produce such a sinusoidal flux pattern as for instance by different coil arrangements, shaping of pole pieces, etc. It should be understood that the arrangement of coils shown in Figure 1 is just one of many ways that may be used to produce a sinusoidal flux pattern.

Figure 3:
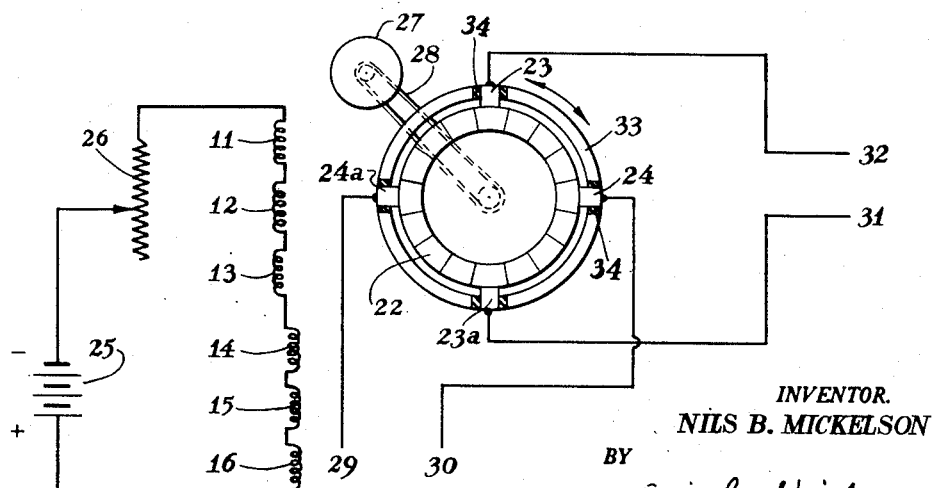
Figure 3 is a schematic view of the entire device with electrical connections.

The rotor of the electro-magnetic device is mounted rotatably within the above described stator. It is of conventional design as used in connection with direct current motors or generators. The rotor is constructed with a conventional armature winding and a commutator such as is well known in the art. In Figure 3, this commutator with commutator elements is identified by numeral 22. The commutator is contacted by two pairs of brushes namely brush 23 and diametrically opposite brush 23a constituting one pair and brush 24 and opposed brush 24a respectively constituting the other pair. Both pairs of brushes are disposed on mutually normal axes with respect to one another and consequently also with respect to the magnetic flux pattern of the stator as established by the series connected field windings 11 to 16 inclusive. When the field windings are energized from a source of direct current 25, through adjustable series connected resistor 26, these field windings will produce a sinusoidal flux pattern which traverses the rotor. Upon imparting mechanical rotation to the rotor from a driving means 27, via a coupling means 28, the armature winding intersects the magnetic flux established by the field windings and as a result thereof, a voltage is induced in the armature winding. This armature voltage is apparent on the brushes which contact the commutator and may be measured between terminals 29 and 30 associated with brushes 24 and 24a, and between terminals 31 and 32 associated with brushes 23 and 23a respectively. Since the brush pairs are disposed on mutually normal axes with respect to one another, and consequently also with respect to the magnetic flux pattern established by the field coils, the voltage measured on each pole pair is the product of the maximum generated direct current voltage and the sine or cosine respectively of the angular displacement of the brushes with respect to the stationary magnetic flux pattern. It is obvious furthermore that the maximum generated direct current voltage is dependent upon the flux density as determined by the number of ampere turns in the stator field windings and by the speed of the rotor. By varying the speed of the rotor or by varying the current in the field windings or both, the output voltage apparent on terminals 29 and 30, and 31 and 32 respectively may be varied within wide limits.

The brushes are mounted and retained by means of suitable insulation 34 in an annular ring 33 for rotation in unison about the surface of the commutator and thereby with respect to the stationary flux pattern.

By virtue of this arrangement the angular sine-cosine relationship of the two pairs of brushes is assured for all angular positions. The brushes may be rotated about the commutator through any range of angle without encountering any discontinuity of the output voltages or of the mathematical functions. The voltage output versus angular displacement is continuous rather than a step by step increase or decrease.

It will be apparent to those skilled in the art that a similar result is achieved if a uniform parallel flux is generated by the field windings rather than a sinusoidal flux pattern as shown in Figures 1 and 2. Furthermore a plurality of field poles may be used together with a corresponding plurality of brushes to establish two, three or more cycles of sinusoidally shaped flux patterns for one 360 degree revolution of the rotor. In this latter construction the brush retaining ring 33 would be rotated through 180 or 120 degrees respectively, or less, depending upon the number of sinusoidal flux patterns, to obtain one complete cycle of sine and cosine output relationship of the generated voltage.

While there have been described and illustrated specific embodiments of the invention, it will be obvious that various changes and modifications may be made therein without departing from the field of the invention which should be limited only by the scope of the appended claims.

What is claimed is:

1. An electro-magnetic device for generating two voltages representing the sine and cosine function of an output voltage, comprising a stator having a plurality of transverse slots, field windings disposed in said slots, a rotor rotatably disposed within said stator, said rotor constructed with an armature winding and a commutator, a plurality of brushes contacting said commutator at mutually normal axes, said field windings on being energized with direct current adapted to establish a sinusoidal magnetic flux pattern for generating voltages apparent on said brushes when motion is imparted to said rotor and said voltages being proportional to the sine and cosine respectively of the angular disposition of said brushes with respect to said magnetic flux pattern.

2. An electro-magnetic device for generating two voltages representing the sine and cosine function of a direct current voltage, comprising a stator having a plurality of transverse slots, field windings disposed in said slots and arranged to establish a substantially sinusoidal magnetic flux pattern when energized with direct current, a rotor rotatably disposed within said stator, said rotor constructed with an armature winding and a commutator, a plurality of brushes contacting said commutator at mutually normal axes, means to position said brushes about the commutator for changing their disposition with respect to the magnetic flux pattern established by said field windings and means to impart mechanical rotation to said rotor to cause said armature winding to intersect said flux and generate direct current voltages apparent on said brushes proportional to the product of generated peak voltage and the sine and cosine angle respectively of the angular disposition of said brushes.

3. An electro-magnetic device for generating two voltages representing the sine and cosine function of a direct current voltage, comprising a stator having a plurality of transverse slots, field windings disposed in said slots and arranged to establish a single cycle sinusoidal magnetic flux pattern when energized with direct current, a rotor rotatably disposed within said stator, said rotor constructed with an armature winding and a commutator, a plurality of brushes contacting said commutator at mutually normal axes, means to position said brushes about the commutator for changing their disposition with respect to the magnetic flux pattern established by said field windings and means to impart adjustable mechanical rotation to said rotor to cause said armature winding to intersect said flux and generate direct current voltages apparent on said brushes proportional to the generated peak voltage as influenced by the rotational speed of said rotor and the sine and cosine angle respectively of the angular disposition of said brushes about said commutator.

4. An electro-magnetic device for generating voltages representing the sine and cosine function of a generated output voltage, comprising a stator having a plurality of transverse slots, field windings disposed in said slots, a rotor rotatably disposed within said stator, said rotor constructed with an armature winding and a commutator, a plurality of brushes contacting said commutator at mutually normal axes, means to position said brushes about said commutator for changing their disposition with respect to said stator, said field windings on being energized with direct current adapted to establish a sinusoidal magnetic flux pattern for generating voltages apparent on said brushes when motion is imparted to said rotor, said voltages being proportional to the peak voltage generated and to the sine and cosine respectively of the angular disposition of said brushes with respect to said magnetic flux pattern, means to adjust the direct current in said field windings and means to adjust the speed of said rotor for influencing the peak voltage.

References Cited in the file of this patent

UNITED STATES PATENTS

| Number | Name | Date |
|---|---|---|
| 550,663 | Thomas | Dec. 3, 1895 |
| 838,144 | Stanley | Dec. 11, 1906 |
| 2,072,768 | Pestarini | Mar. 2, 1937 |